(12) United States Patent
Nakagawa et al.

(10) Patent No.: US 6,834,392 B2
(45) Date of Patent: *Dec. 21, 2004

(54) DISK READING/WRITING DEVICE AND READABLE/WRITABLE DISK

(75) Inventors: Katsuya Nakagawa, Tokyo (JP); Yoshikazu Takahashi, Kanagawa (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 136 days.

(21) Appl. No.: 10/118,209

(22) Filed: Apr. 9, 2002

(65) Prior Publication Data

US 2002/0172138 A1 Nov. 21, 2002

(30) Foreign Application Priority Data

Apr. 13, 2001 (JP) .................................... P2001-115591

(51) Int. Cl.$^7$ ............................................. G11B 23/00
(52) U.S. Cl. ....................................................... 720/604
(58) Field of Search ......................... 720/604; 369/270, 369/75.2, 271

(56) References Cited

U.S. PATENT DOCUMENTS

| | | | | |
|---|---|---|---|---|
| 5,034,933 A | * | 7/1991 | Fujisawa et al. | 369/13.35 |
| 5,666,347 A | * | 9/1997 | Yoshida et al. | 369/282 |
| 5,671,210 A | * | 9/1997 | Goto | 369/271 |
| 5,742,571 A | * | 4/1998 | Hoshino et al. | 369/30.98 |
| 5,859,834 A | * | 1/1999 | Takahashi et al. | 369/290 |
| 6,167,014 A | * | 12/2000 | Kajiyama et al. | 369/75.2 |
| 2001/0015951 A1 | * | 8/2001 | Yabushita | 369/270 |

* cited by examiner

*Primary Examiner*—William Klimowicz
*Assistant Examiner*—Mark Blouin
(74) *Attorney, Agent, or Firm*—Rader, Fishman & Grauer PLLC; Ronald P. Kananen

(57) ABSTRACT

In a disk reading/writing device, a chucking mechanism holds two types of disks having different outer diameters. The chucking area of a small-diameter disk is set to be less then the chucking area of a large-diameter disk. The disks are focused by an optical pickup placed on the side opposite the chucking surface. This configuration makes it possible to enlarge the data area of the small-diameter disk and to perform reading and writing from and onto the small-diameter disk with an enlarged data area.

4 Claims, 5 Drawing Sheets

DISK READING/WRITING DEVICE AND READABLE/WRITABLE DISK

BACKGROUND OF THE INVENTION

1. Field of the Invention

The present invention relates to a readable/writable disk, such as an optical disk, and a disk reading/writing device for performing reading and writing from and onto the readable/writable disk. More particularly, the present invention relates to techniques of chucking disks having different outer diameters by a common chucking mechanism and increasing the data area of a small-diameter disk by reducing the chucking area.

2. Description of the Related Art

FIGS. 8 and 9 show a known type of chucking mechanism that can chuck a plurality of disks having different diameters. Referring to these figures, a disk base 20 has an aligning shaft 21 at the center of its upper surface, and is rotated by a spindle motor 22. FIG. 8 shows a state of chucking a small-diameter disk 23, and FIG. 9 shows a state of chucking a large-diameter disk 24. Both disks 23 and 24 are focused by an optical pickup 25 from the side of the disk base 20.

Regardless of the diameter, the above small-diameter and large-diameter disks 23 and 24 respectively have lead-in areas 23a and 24a in which management information is written at a specific position at the inner periphery thereof.

The chucking area is determined so as to be optimal for the large-diameter disk 24. While a sufficient chucking area is ensured in the small-diameter disk 23, it makes up a larger proportion of the small-diameter disk 23, and the volume of data that can be stored is limited.

In view of the above problems in the small-diameter disk 23, it is possible to increase the volume of data that can be stored. However, since the optical pickup 25 for focusing the disk is placed on the side of the disk base 20 in the chucking state of the small-diameter disk 23 shown in FIG. 8, the movement of the optical pickup 25 toward the inner peripheral side is limited by the disk base 20. Consequently, it is difficult to enlarge the data area.

SUMMARY OF THE INVENTION

The present invention has been made in order to overcome the above problems, and an object of the invention is to provide a disk reading/writing device in which a chucking mechanism is structured so that the chucking area of a small-diameter disk is less than the chucking area of a large-diameter disk, and the disks are focused by an optical pickup that is placed on the side opposite a chucking surface.

Another object of the present invention is to perform reading and writing from and onto a small-diameter readable/writable disk in which the data area is enlarged by reducing the chucking area thereof.

In order to achieve the above objects, the present invention provides a disk reading/writing device wherein a chucking mechanism is structured so that the chucking area of a small-diameter disk is less than the chucking area of a large-diameter disk, and the disks are focused by an optical pickup placed on the side opposite a chucking surface.

The chucking area of a small-diameter disk of the readable/writable disks is set to be less than the chucking area of a large-diameter disk.

In the disk reading/writing device and the readable/writable disk having the above-described configuration, since the chucking area of the small-diameter disk is reduced, it is possible to place the chucking area closer to the inner periphery, to enlarge the data area of the small-diameter disk, and to increase the volume of data.

Further objects, features and advantages of the present invention will become apparent from the following description of the preferred embodiments with reference to the attached drawings.

DESCRIPTION OF THE PREFERRED EMBODIMENTS

A disk reading/writing device and a readable/writable disk according to an embodiment of the present invention will be described below with relation to large and small disks and with reference to the attached drawings.

Figure 1:
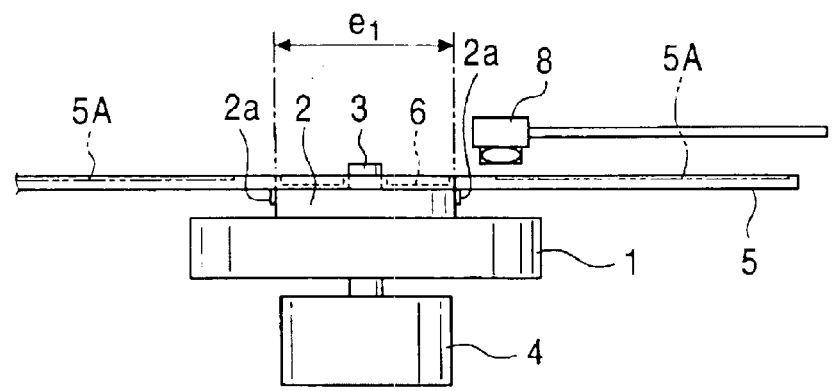
FIG. 1 is a side view showing a state in which a small-diameter disk is chucked by a chucking mechanism according to a first embodiment of the present invention.
Figure 2:
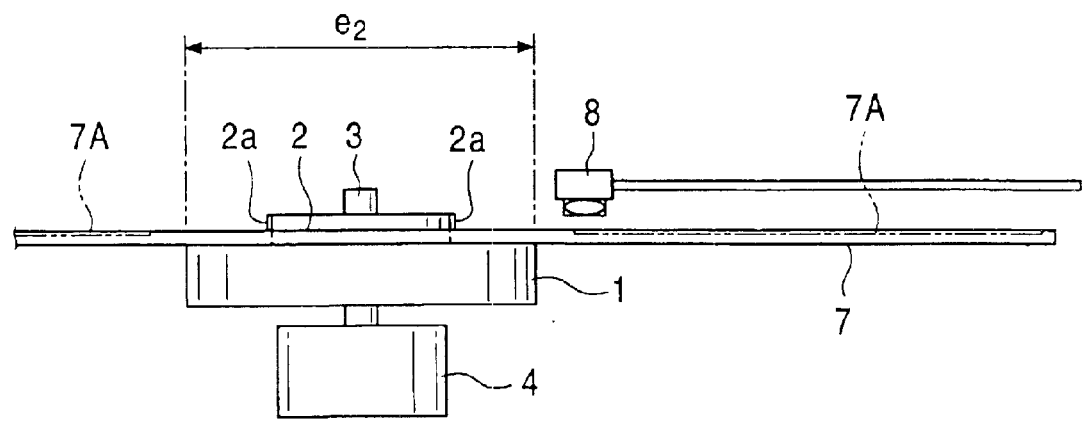
FIG. 2 is a side view showing a state in which a large-diameter disk is chucked by the chucking mechanism.

FIG. 1 is a side view showing a state in which a small-diameter disk is held by a chucking mechanism according to a first embodiment of the present invention, and FIG. 2 is a side view showing a state in which a large-diameter disk is held by the chucking mechanism.

In the chucking mechanism, a magnetically attractive disk base 2 is formed at the center of the upper surface of a disk base 1. The magnetically attractive disk base 2 has a diameter smaller than that of the disk base 1. An aligning shaft 3 is formed at the center of the upper surface of the magnetically attractive disk base 2. The disk base 1, the magnetically attractive disk base 2, and the aligning shaft 3 are rotated together by a spindle motor 4.

Figure 3:
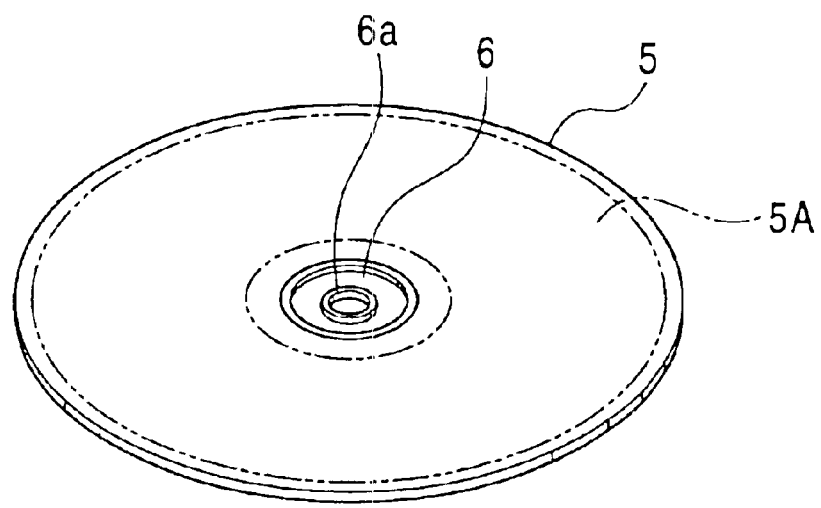
FIG. 3 is a perspective view of a small-diameter disk.

A small-diameter disk 5 to be chucked by the chucking mechanism is provided with a metal plate 6 having a center hole 6a, as shown in FIG. 3. The diameter of the metal plate 6 is equal to the outer diameter of the disk base 2. That is, the small-diameter disk 5 is fitted on the aligning shaft 3 so that the metal plate 6 is attracted to the magnetically attractive disk base 2. Consequently, the small-diameter disk 5 has a chucking area $e_1$ that is smaller than before, as shown in FIG. 1.

Figure 4:
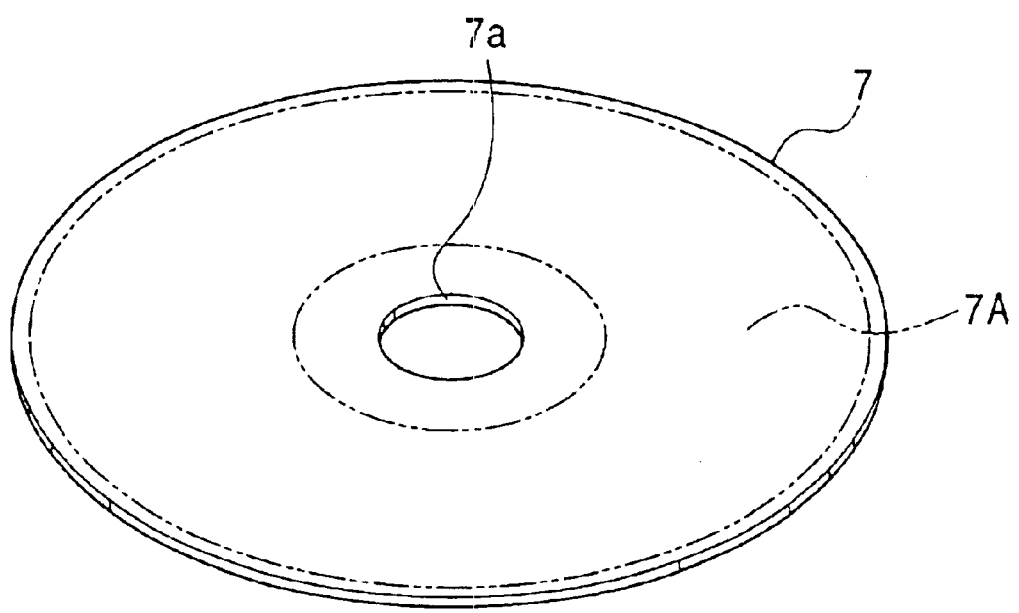
FIG. 4 is a perspective view of a larger-diameter disk.

In contrast, a large-diameter disk 7 is provided with a center hole 7a formed at its center, as shown in FIG. 4. The large-diameter disk 7 is held to the disk base 1 by being fitted on the magnetically attractive disk base 2 with the center hole 7a used as an aligning shaft. In this case, the large-diameter disk 7 has a chucking area $e_2$. The magnetically attractive disk base 2 has a plurality of elastic projections 2a on its peripheral surface so as to prevent the large-diameter disk 7 from falling off.

An optical pickup 8 for focusing a data area 5A of the small-diameter disk 5 and a data area 7A of the large-diameter disk 7 is placed on the side opposite the disk base 1, that is, on the upper side of the disk in the above chucking mechanism. Since the distance from the optical pickup 8 differs between the small-diameter disk 5 and the large-diameter disk 7, a position-shifting mechanism and a control circuit are necessary to adjust the focusing of the disk surface.

A description will be given below of why the moment of force does not have any influence even when the chucking area of the small-diameter disk 5 is reduced.

When the disk's angular velocity is represented by $\omega_d$, and the angular velocity at which the disk rotating shaft is tilted is represented by $\omega_a$, a moment of force N given by the following equation is added:

$$[[N=(\Sigma mr^2)\omega_d\omega_n=\omega_d\omega_n\int b^a r^2 dm=\omega_d\omega_n\int b^a r^2 \cdot 2n\sigma rdr=2n\sigma\omega_d\omega_n\int b^a r^3 dr=\frac{1}{2}n\sigma\omega_d\omega_n(a^4-b^4)]]$$

$$N = \left(\sum mr^2\right)\omega_d\omega_n = \omega_d\omega_n\int_b^a r^2 dm =$$

$$\omega_d\omega_n\int_b^a r^2 \cdot 2\pi\sigma rdr = 2\pi\sigma\omega_d\omega_n\int_b^a r^3 dr = 1/2\pi\sigma\omega_d\omega_n(a^4-b^4)$$

where dm represents the mass of the disk per unit volume, r represents the distance from the center, a represents the disk radius, b represents the radius of the chucking area, and σ represents the surface density.

As the outer diameter of the disk increases, the disk radius a in the above equation increases, and the moment of force also increases. As the chucking area increases, however, the radius b of the chucking area increases, and the moment of force decreases. When the moment of force increases, the amount of distortion of the disk increases, the disk tilts relative to the rotating shaft, and the skew characteristic is deteriorated. Moreover, when the moment of force increases excessively, the disk may fall off the chucking mechanism.

In contrast, when the disk radius a decreases, the moment of force also decreases. Therefore, even when the chucking area is reduced, the skew characteristic is not affected and the disk does not fall off.

That is, the small-diameter disk 5 is not affected by the moment of force even when the chucking area is reduced. The lead-in area can be formed from a position close to the chucking area, and the data area 5 can be enlarged. These advantages also can be achieved by placing the optical pickup 8 on the side opposite the disk base 1.

Figure 5:
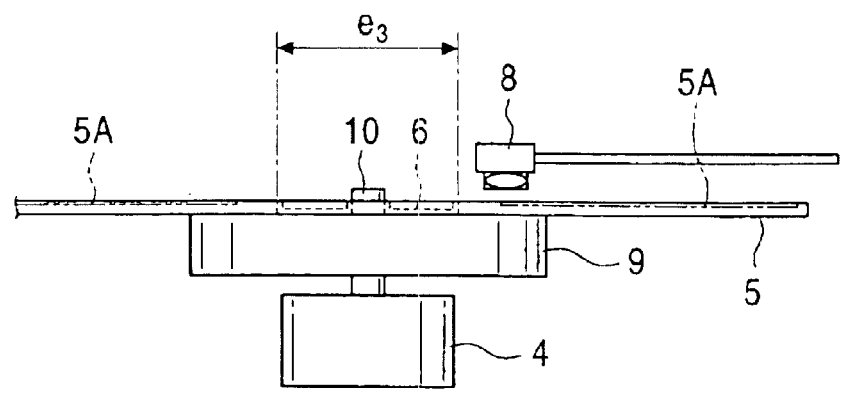
FIG. 5 is a side view showing a state in which a small-diameter disk is chucked by a chucking mechanism according to a second embodiment of the present invention.
Figure 6:
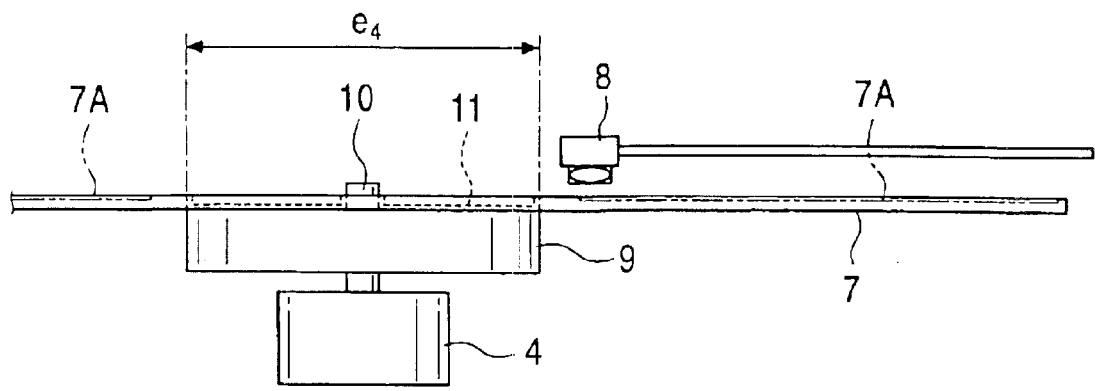
FIG. 6 is a side view showing a state in which a large-diameter disk is chucked by the chucking mechanism.

FIGS. 5 and 6 are side views, respectively, showing states in which a small-diameter disk and a large-diameter disk are chucked by a chucking mechanism according to a second embodiment of the present invention. The same components as those in the first embodiment shown in FIGS. 1 and 2 are denoted by the same reference numerals.

In the chucking mechanism of this embodiment, a magnetically attractive disk base 9 corresponds to the disk base 1 in the first embodiment. An aligning shaft 10 is formed at the center of the magnetically attractive disk base 9. The magnetically attractive disk base 9 and the aligning shaft 10 are rotated together by a spindle motor 4.

A small-diameter disk 5 to be chucked by the chucking mechanism is provided with a metal plate 6 having a center hole, in a manner similar to that shown in FIG. 1. That is, the small-diameter disk 5 is fitted on the aligning shaft 10 so that the metal plate 6 is attracted to the magnetically attractive disk base 9. In this case, the small-diameter disk 5 has a chucking area $e_3$ that is smaller than the area of the magnetically attractive disk base 9.

In contrast, a large-diameter disk 7 is provided with a metal plate 11 having a center hole. The metal plate 11 has an outer diameter equal to that of the magnetically attractive disk base 9, and is attracted to the magnetically attractive disk base 9. In this case, the large-diameter disk 7 has a chucking area $e_4$.

The above-described configuration makes it possible to form a lead-in area from a position close to the chucking area in the small-diameter disk 5 and to enlarge a data area 5A. These advantages also can be achieved by placing an optical pickup 8 on the side opposite the magnetically attractive disk base 9.

Since the small-diameter disk 5 and the large-diameter disk 7 can be chucked at the same height from the magnetically attractive disk base 9, a position-shifting mechanism and a control circuit for adjusting the focusing of the optical pickup 8 are unnecessary.

Figure 7:
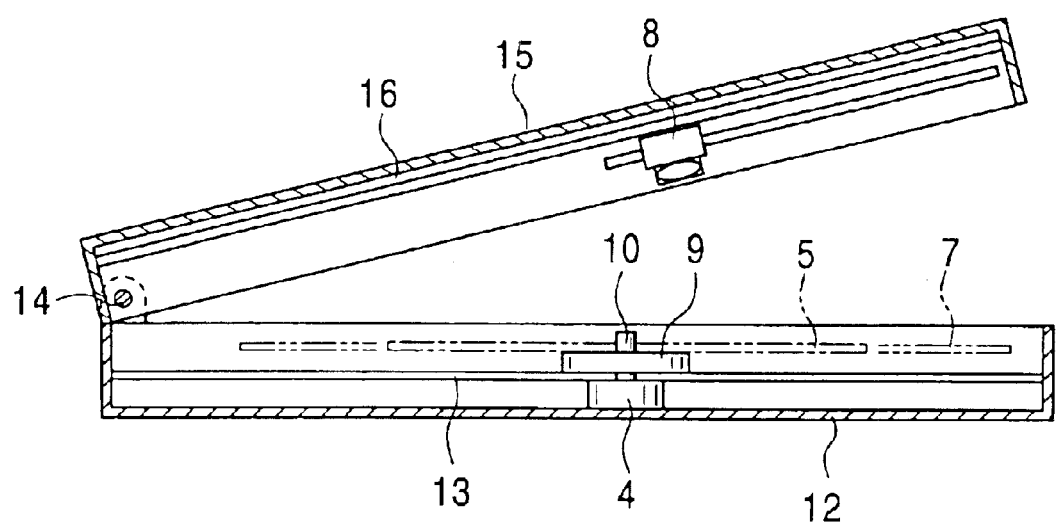
FIG. 7 is a sectional view of a disk reading/writing device to which the second embodiment is applied.
Figure 8:
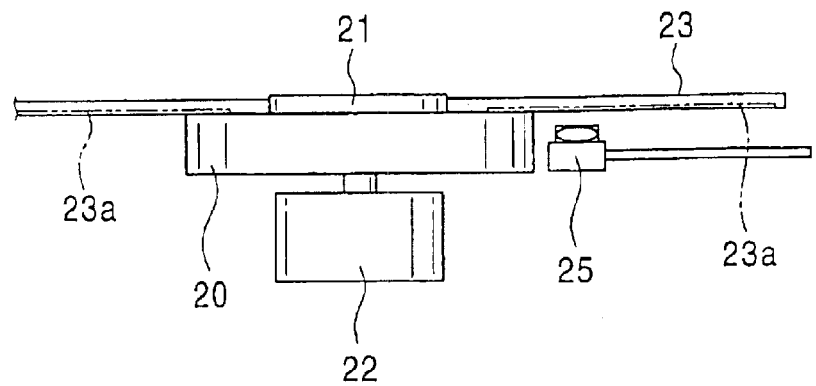
FIG. 8 is a side view showing a state in which a small-diameter disk is chucked by a related chucking mechanism.
Figure 9:
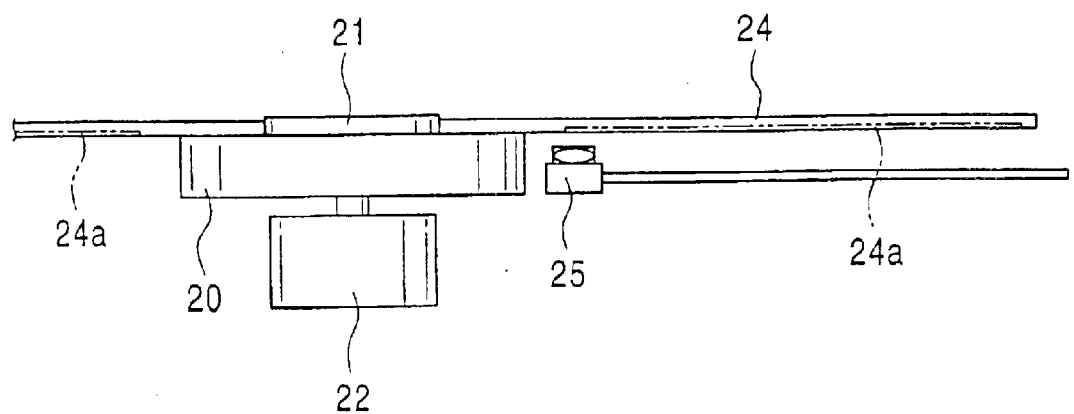
FIG. 9 is a side view showing a state in which a large-diameter disk is chucked by the related chucking mechanism.

FIG. 7 is an explanatory view of a disk reading/writing device to which the above-described second embodiment is applied. The spindle motor 4 and the magnetically attractive disk base 9 are placed in a chassis 13 of a main case 12. The optical pickup 8 is placed on a substrate 16 disposed in a cover case 15 that is pivotally connected to the main case 12 by hinges 14.

It is assumed that when the small-diameter disk 5 and the large-diameter disk 7 are CDs (compact disks), they are loaded with the label surface facing the magnetically attractive disk base 9 (downward) and the recording surface facing the cover case 15. When the cover case 15 is closed, the optical pickup 8 is positioned opposing the recording surface, and a reading operation is performed.

While the chassis 13 of the main case 12 and the substrate 16 of the cover case 15 are generally aligned, for example, by using a positioning pin and a positioning hole formed corresponding to each other when high precision is required, they may be aligned by other means.

The main case 12 and the chassis 13 need not be always separate, and they may be combined or may be formed in one piece. When the main case 12 and the chassis 13 are separate, they need to be connected by a cushioning member in order to minimize impact, such as vibration, applied to the chucking mechanism held in the chassis 13. This also applies to the connection between the cover case 15 and the optical pickup 8.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

While two-types of disks having different outer diameters are used for the disk reading/writing device in the above embodiments, the present invention can be widely applied to disk reading/writing devices that are adapted for more than two types of disks having different outer diameters.

The present invention also is widely applied to an optical-disk reading/writing device using an optical pickup, a read/write optical disk, a magneto-optical disk reading/writing device using an optical pickup and a magnetic head, a read/write magneto-optical disk, a magnetic-disk reading/ writing device using a magnetic head instead of an optical pickup, a read/write magnetic disk, and the like.

While the present invention is applied to various disk reading/writing devices in the above embodiments, of course, it is also applicable to various disk writing and various disk reading devices.

What is claimed is:

1. A disk reading/writing device for reading from or writing to a large-diameter disk and a small diameter disk, comprising:
    a disk base having a predetermined outer diameter, an upper side as a chucking surface for mounting and chucking either the small-diameter disk or large-diameter disk, and a lower side opposite the upper side;
    a spindle motor coupled to said disk base and placed on the lower side of the disk base; and
    an optical pickup mounted over the upper side of the disk base for reading information from said large-diameter or small-diameter disk or writing information to said large-diameter or small-diameter disk mounted on the chucking surface,
    wherein the chucking area of the small-diameter disk is less than the chucking area of the large-diameter disk, wherein the chucking surface of the small diameter disk is vertically offset relative to the chucking surface of the large diameter disk and said optical pickup moves within the diameter of the disk base so that said optical pickup can read information from or write information to the extended recording area of said small-diameter disk.

2. The disk reading/writing device of claim 1, wherein said disk base is magnetically attractive, an aligning shaft is formed on the magnetically attractive disk base, and said large-diameter disk or said small-diameter disk is fitted on said aligning shaft so that the large-diameter or small-diameter disk is attracted to said magnetically attractive disk base.

3. The disk/reading writing device of claim 1, wherein said disks include magnetic disks, optical disks, and magneto-optical disks.

4. The disk/reading writing device of claim 1, further comprising:
    a magnetically attractive disk base formed on said disk base and having a diameter smaller than the diameter of said disk base.

* * * * *